US008578211B2

(12) United States Patent
Reed et al.

(10) Patent No.: US 8,578,211 B2
(45) Date of Patent: Nov. 5, 2013

(54) REAL TIME ERROR DETECTION IN MULTIMODAL COMMUNICATION SYSTEMS

(75) Inventors: Jeffrey Reed, Bothell, WA (US); Nilkund Aseef, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 407 days.

(21) Appl. No.: 12/967,380

(22) Filed: Dec. 14, 2010

(65) Prior Publication Data

US 2012/0151266 A1 Jun. 14, 2012

(51) Int. Cl.
*G06F 11/00* (2006.01)

(52) U.S. Cl.
USPC ............. 714/26; 714/37; 714/47.1; 714/47.2; 714/57

(58) Field of Classification Search
USPC ........... 714/25, 26, 33, 37, 43, 46, 47.1, 47.2, 714/47.3, 48, 57
See application file for complete search history.

(56) References Cited

U.S. PATENT DOCUMENTS

| | | | |
|---|---|---|---|
| 6,553,515 B1 | 4/2003 | Gross et al. | |
| 6,778,638 B1* | 8/2004 | Jean et al. | 714/25 |
| 7,111,205 B1* | 9/2006 | Jahn et al. | 714/47.2 |
| 7,624,305 B2* | 11/2009 | De Araujo et al. | 714/25 |
| 2002/0065885 A1 | 5/2002 | Buonanno et al. | |
| 2003/0115508 A1* | 6/2003 | Ali et al. | 714/43 |
| 2005/0193281 A1* | 9/2005 | Ide et al. | 714/47 |
| 2009/0175193 A1* | 7/2009 | Shaffer et al. | 370/254 |
| 2011/0060948 A1* | 3/2011 | Beebe | 714/37 |
| 2012/0047270 A1* | 2/2012 | Chandrasekaran et al. | 709/227 |

OTHER PUBLICATIONS

Miller, Dan., "Customer Interaction Analytics: Quality of Care on the Critical Path", Retrieved at << http://www.meritalk.com/uploads_legacy/whitepapers/analytics.pdf >>, Oct. 2008, pp. 7.
Wang, et al., "Audiovisual Communication Error Detection", Retrieved at << http://publications.csail.mit.edu/abstracts/abstracts07/sybor/sybor.html <<, 2007, pp. 3.
Pleasant, Blair., "Unified Communications: Cutting through the Hype", Retrieved at << http://viewer.media.bitpipe.com/1206484657_637/1206511483_362/SearchUC-v5.pdf >>, pp. 22.
"CA NetQoS® Unified Communications Monitor", Retrieved at << http://www.ca.com/files/ProductBriefs/netqos_ucs_ps_228201.pdf >>, pp. 1-4.
Wang, et al., "Multi-Modal and Modality Specific Error Handling in the GEMINI Project", Retrieved at << http://lorien.die.upm.es/projects/gemini/78.pdf >>, In Error Handling in Spoken Dialogue Systems, 2003, pp. 6.
Kryszczuk, et al., "Error Handling in Multimodal Biometric Systems Using Reliability Measures", Retrieved at << http://www.google.co.uk/url?sa=t&source=web&cd=1&ved=0CBgQFjAA&url=http%3A%2F%2Fciteseerx.ist.psu.edu%2Fviewdoc%2Fdownload%3Fdoi%3D10.1.1.130.5770%26rep%3Drep1%26type%3Dpdf&rct=j&q=%22ERROR%20HANDLING%20IN%20MULTIMODAL%20BIOMETRIC%20SYSTEMS%20USINGRELIABILITY%20MEASURES%22&ei=9obOTOflHOqN4ga7oMzcDA&usg=AFQjCNEC7xBRIKjp8HaZyUt77QahC70Q8g&cad=rja >>, In 13th European Signal Processing Conference (EUSIPCO 2005); Year 2005.

* cited by examiner

*Primary Examiner* — Joseph D Manoskey
(74) *Attorney, Agent, or Firm* — Turk IP Law, LLC

(57) ABSTRACT

Diagnostic data of a multimodal enhanced communication system is processed at a central diagnostic service by normalizing detected errors based on modalities, traffic volumes, and/or individual user patterns such that failures can be efficiently and accurately analyzed across the communication system. Configurable thresholds may be used for modality-specific logs, traffic volume normalized errors, and persistent user adjusted results to optimize alerts issued to administrators.

19 Claims, 6 Drawing Sheets

REAL TIME ERROR DETECTION IN MULTIMODAL COMMUNICATION SYSTEMS

BACKGROUND

As an alternative to Public Switched Telephone Network (PSTN) systems, cellular phone networks have proliferated over the last decades, where users with cellular phones have access to one or more networks at almost any location. Also a recent development is the wide spread use of Voice over IP (VOIP) telephony, which uses internet protocol (IP) over wired and wireless networks. With the availability of such diverse types of communication networks and devices capable of taking advantage of various features of these networks, enhanced communication systems bring different communication networks together providing until now unavailable functionality such as combining various modes of communication (e.g. instant messaging, voice calls, video communications, etc.). This technology is also referred to as unified communications (UC). A network of servers manages end devices capable of handling a wide range of functionality and communication while facilitating communications between the more modern unified communication network devices and other networks (e.g. PSTN, cellular, etc.).

Diagnostics and error detection are one of the major components of a multimodal communication system such as a UC system. Especially in an environment serving large numbers of users, such systems are in continuous use facilitating a wide variety of communication types and sessions. Failures at different levels may degrade user experience and impair operations in businesses and other organizations employing these systems. Thus, proactive error detection and repair are part of the design goals for enhanced communication systems. In detecting errors and diagnosing problems, however, some of the inherent characteristics of such systems may work against obtaining meaningful data. For example, usage (e.g., number of sessions, exchanged data, etc.) may vary depending on modality skewing the results if diagnostic data is compared equally among different modalities. Similarly, diagnostic data may also be skewed by traffic patterns of different modalities or users with different usage patterns.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to analyzing diagnostic data of a multimodal enhanced communication system at a central diagnostic service by normalizing detected errors based on modalities, traffic volumes, and/or individual user patterns such that failures can be efficiently and accurately analyzed across the communication system.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
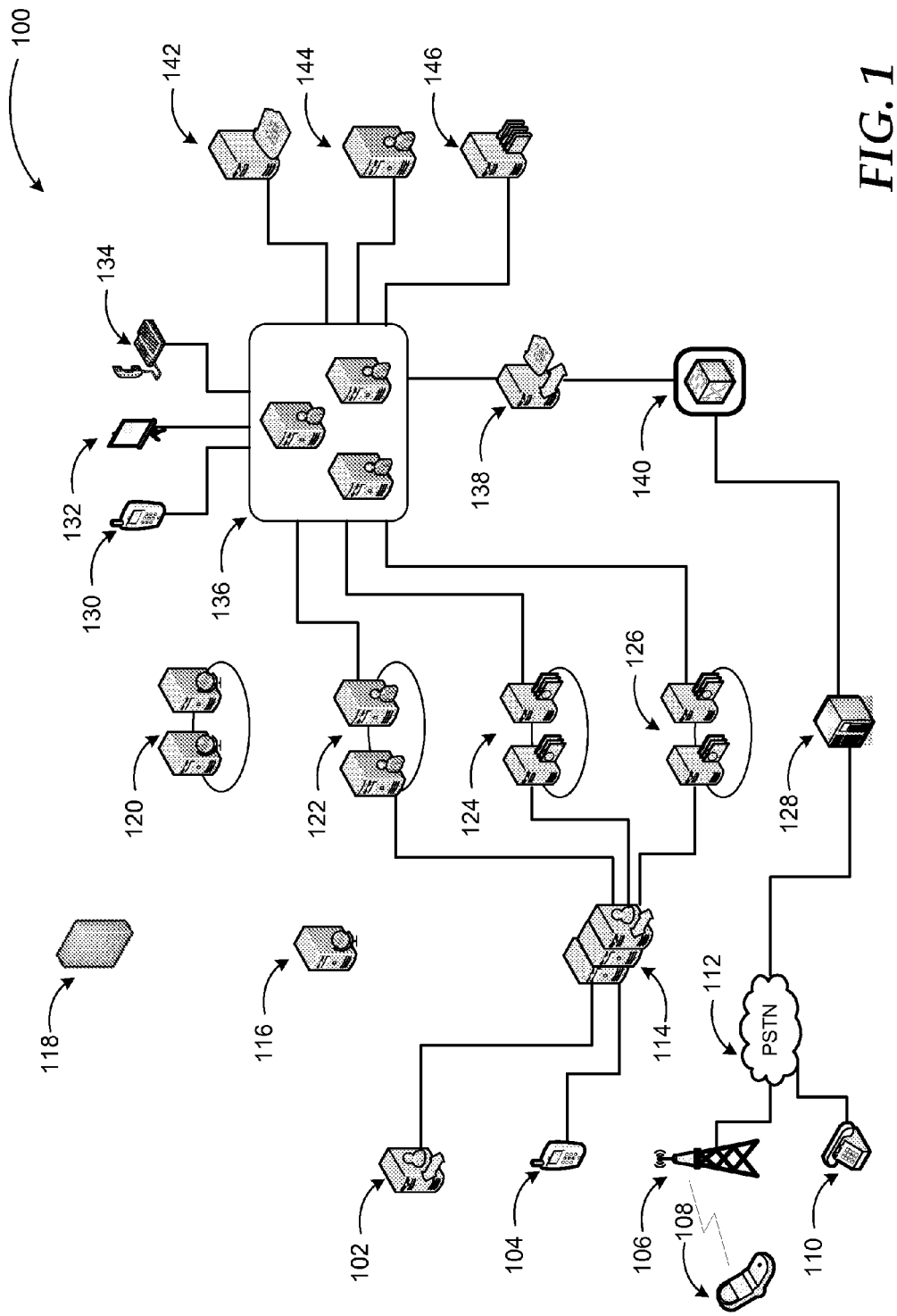
FIG. 1 is a diagram illustrating an example enhanced communications system such as a UC system, where embodiments may be implemented for real time error detection based on modalities.

As briefly described above, diagnostic data of a multimodal enhanced communication system may be analyzed at a central diagnostic service by normalizing detected errors based on modalities, traffic volumes, and/or individual user patterns such that failures can be efficiently and accurately analyzed across the communication system. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing distributed server systems. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below. The term "site" as used herein refers to a geographical location and may include data centers, branch offices, and similar communication sub-systems. Furthermore, the term cluster refers to a group of physical and/or virtual servers, which may provide the same service to a client in a transparent manner (i.e., the client sees a single server, while the cluster may have a plurality of servers).

FIG. 1 includes diagram 100 illustrating an example enhanced communications system such as a UC system, where embodiments may be implemented for real time error detection based on modalities. A unified communication (UC) system is an example of modern communication systems with a wide range of capabilities and services that can be provided to subscribers. A unified communication system is a real-time communications system facilitating email exchange, instant messaging, presence, audio-video conferencing, web conferencing, and similar functionalities.

In a unified communication (UC) system such as the one shown in diagram 100, users may communicate via a variety of end devices 130, 132, 134, which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through Private Branch Exchange (PBX) 128 to a Public Switched Telephone Network (PSTN) 112. Further communications through PSTN 112 may be established with a telephone 110 or cellular phone 108 via cellular network tower 106. End devices 130, 132, 134 may include any type of smart phone, cellular phone, any computing device executing a communication application, a smart automobile console, and advanced phone devices with additional functionality.

The UC system shown in diagram 100 may include a number of servers performing different tasks. For example, edge servers 114 may reside in a perimeter network and enables connectivity through UC network(s) with other users such as remote user 104 or federated server 102 (for providing connection to remote sites). A Hypertext Transfer Protocol (HTTP) reverse protocol proxy server 116 may also reside along the firewall 118 of the system. Edge servers 114 may be specialized for functionalities such as access, web conferencing, audio/video communications, and so on. Inside the firewall 118, a number of clusters for distinct functionalities may reside. The clusters may include web servers for communication services 120, director servers 122, web conferencing servers 124, and audio/video conferencing and/or application sharing servers 126. Depending on provided communication modalities and functionalities, fewer or additional clusters may also be included in the system.

The clusters of specialized servers may communicate with a pool of registrar and user services servers 136. The pool of registrar and user services servers 136 is also referred to as a data center. A UC system may have one or more data centers, each of which may be at a different site. Registrar servers in the pool register end devices 130, 132, and 134, and facilitate their communications through the system acting as home servers of the end points. User services server(s) may provide presence, backup monitoring, and comparable management functionalities. Pool of service servers 136 may include a cluster of registrar servers. The registrar servers may act as backups to each other. The cluster of registrar servers may also have backup clusters in other data servers as described later.

Mediation server 138 mediates signaling and media to and from other types of networks such as a PSTN or a cellular network (e.g. calls through PBX 128) together with IP-PSTN gateway 140. Mediation server 138 may also act as a Session Initiation Protocol (SIP) user agent. In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a commonly used method. SIP is an application-layer control (signaling) protocol for creating, modifying, and terminating sessions with one or more participants. It can be used to create two-party, multiparty, or multicast sessions that include Internet telephone calls, multimedia distribution, and multimedia conferences. SIP is designed to be independent of the underlying transport layer.

Additional components of the UC system may include messaging server 142 for processing voicemails and similar messages, application server 144 for specific applications, and archiving server 146. Each of these may communicate with the data center pool of registrar and user services servers 136. Various components of the system may communicate using protocols like SIP, HTTP, and comparable ones.

As mentioned previously, UC system is a multimodal communication system. Diagnostic data collected at different components of the system may be skewed based a modality of communications associated with the data, total traffic volumes (number, duration, amount of data associated with the sessions), or user patterns (e.g., users that repetitiously utilize a communication method associated with a failure). One of the ancillary functionalities of the UC system may include diagnostics and error detection, which may be performed through analysis of collected diagnostic data normalizing it based on modality, total traffic volume, and/or user patterns.

While the example system in FIG. 1 has been described with specific components such as registrar servers, mediation servers, A/V servers, and similar devices, embodiments are not limited to these components or system configurations and can be implemented with other system configuration employing fewer or additional components. Real time error detection based on modalities may be distributed among the components of the system depending on component capabilities and system configuration. Furthermore, embodiments are not limited to unified communication systems. The approaches discussed here may be applied to any multimodal communication system using the principles described herein.

Figure 2:
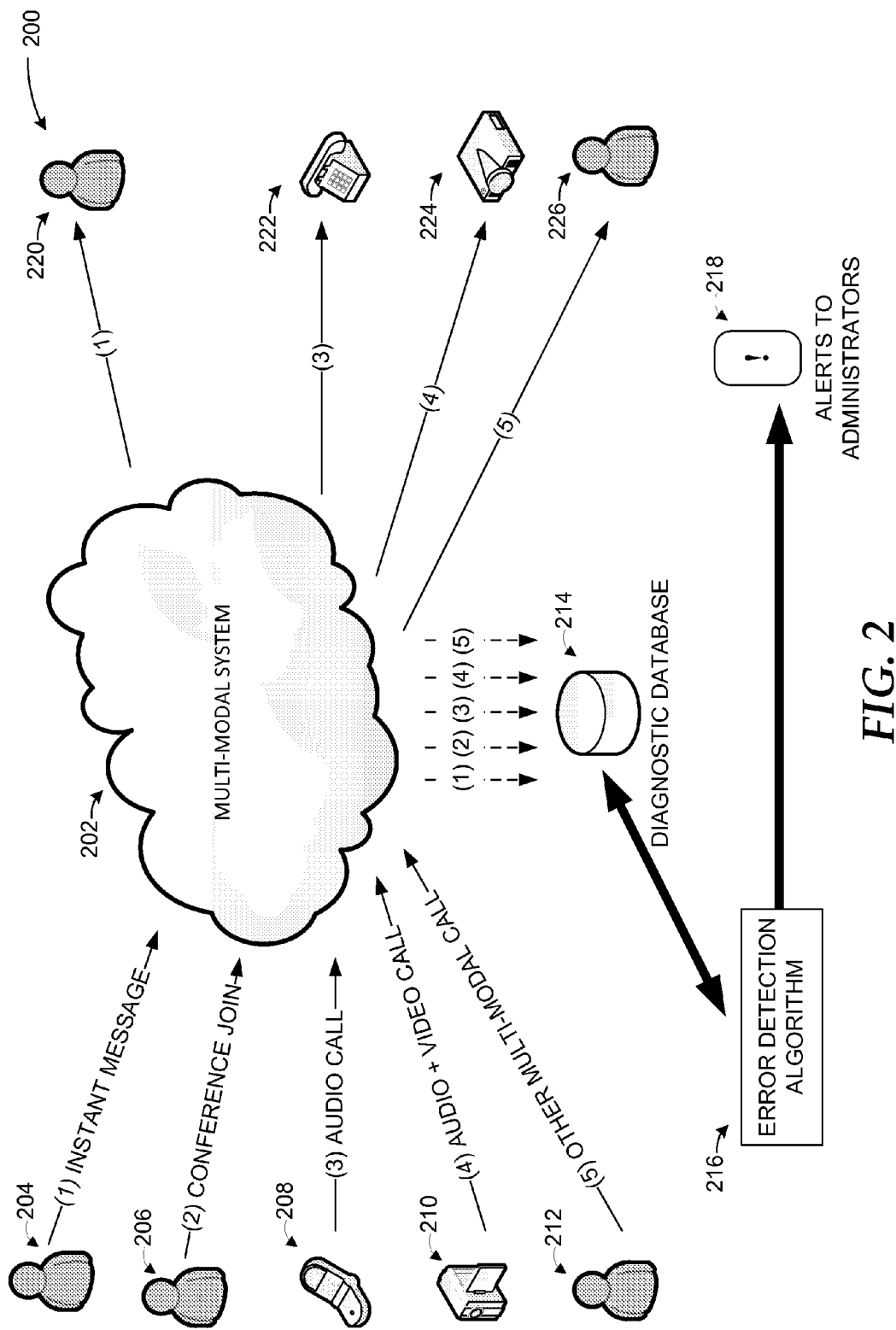
FIG. 2 is a conceptual diagram illustrating multimodal communications and error detection in a multimodal enhanced communication system.

FIG. 2 is a conceptual diagram illustrating multimodal communications and error detection in a multimodal enhanced communication system. In multimodal systems with large volumes of users, the ability to notify administrators quickly about specific problems impacting an overall quality of the system may enhance user experience. Diagnostic data collection may be performed in such systems in a variety of ways, at end device level, at server level, by different software or hardware components, etc. However, some modalities are inherently "chattier" than others generating/exchanging higher volumes of data, larger number of sessions, or involving larger number of users. Thus, catastrophic failures affecting one modality may be drowned out by rare issues affecting a second modality because the traffic volume of the second modality is inherently larger.

Moreover, usage patterns may vary from customer to customer making it difficult to set general thresholds based on error volumes. For example, a file sharing company may provide a service which uses file transfer exclusively, and not care about audio or video. A conferencing provider may care greatly about peer-to-peer audio and video, audio conferencing and application sharing, but may not be interested in instant messaging or file transfer.

Yet another skewing factor in diagnosing failures in a multimodal communication system is the so-called "persistent" user. Some users may repeatedly initiate a communication session if they receive an error (e.g., calling a number again and again in response to a busy signal). This may artificially raise the failure's importance in the analysis of diagnostic data, also referred to as noisy alerts.

In a multimodal system 202 according to embodiments, diagnostics for each session may be recorded in a centralized location (e.g., diagnostic database 214). An error detection algorithm 216 executed by a diagnostic application may determine which modalities are used by each session and if a diagnostic indicates a normal or abnormal behavior (failure or error). The algorithm may analyze diagnostic data over a predefined period of time (e.g., last 24 hours, last 48 hours, last week, etc.) and compute a total volume (e.g., total number of sessions), a diagnostic volume (e.g., number of sessions affected by a failure), and a user volume (e.g., number of users impacted for each modality). A threshold for raising an alert 218 may be defined based on the above described parameters and used to minimize noise and maximize effectiveness in diagnosis of problems in the multimodal communication system 202.

A non-exhaustive set of example communication modalities are illustrated in diagram 200 facilitated by multimodal communication system 202. The example communications may include an instant message exchange session between users 204 and 220, and audio call between end devices 208 and 222, an audio/video call between end devices 210 and 224, and a multimodal call between users 212 and 226. An additional example may be user 206 joining an ongoing conference, which may include audio/video/data sharing/application sharing and so on. As the examples illustrate, the communication sessions may include more than one modality (e.g. audio/video). Diagnostic details related to different modalities may be provided to the error detection algorithm.

Thus, the error detection algorithm 216 looks for failure trends in the diagnostic data which may be raised to administrators. The alerting intelligence may reside in a central location and analyze failures across the entire communication system. Issuing alerts on individual diagnostic codes may render them more actionable to administrators. Furthermore, evaluating modalities separately may enable issues affecting lesser used modalities to be detected. Measuring failure volumes against total traffic volumes may enable thresholds to remain substantially the same regardless of the deployment size. Moreover, having a user threshold may limit an individual user's ability to generate a noisy alert.

Figure 3:
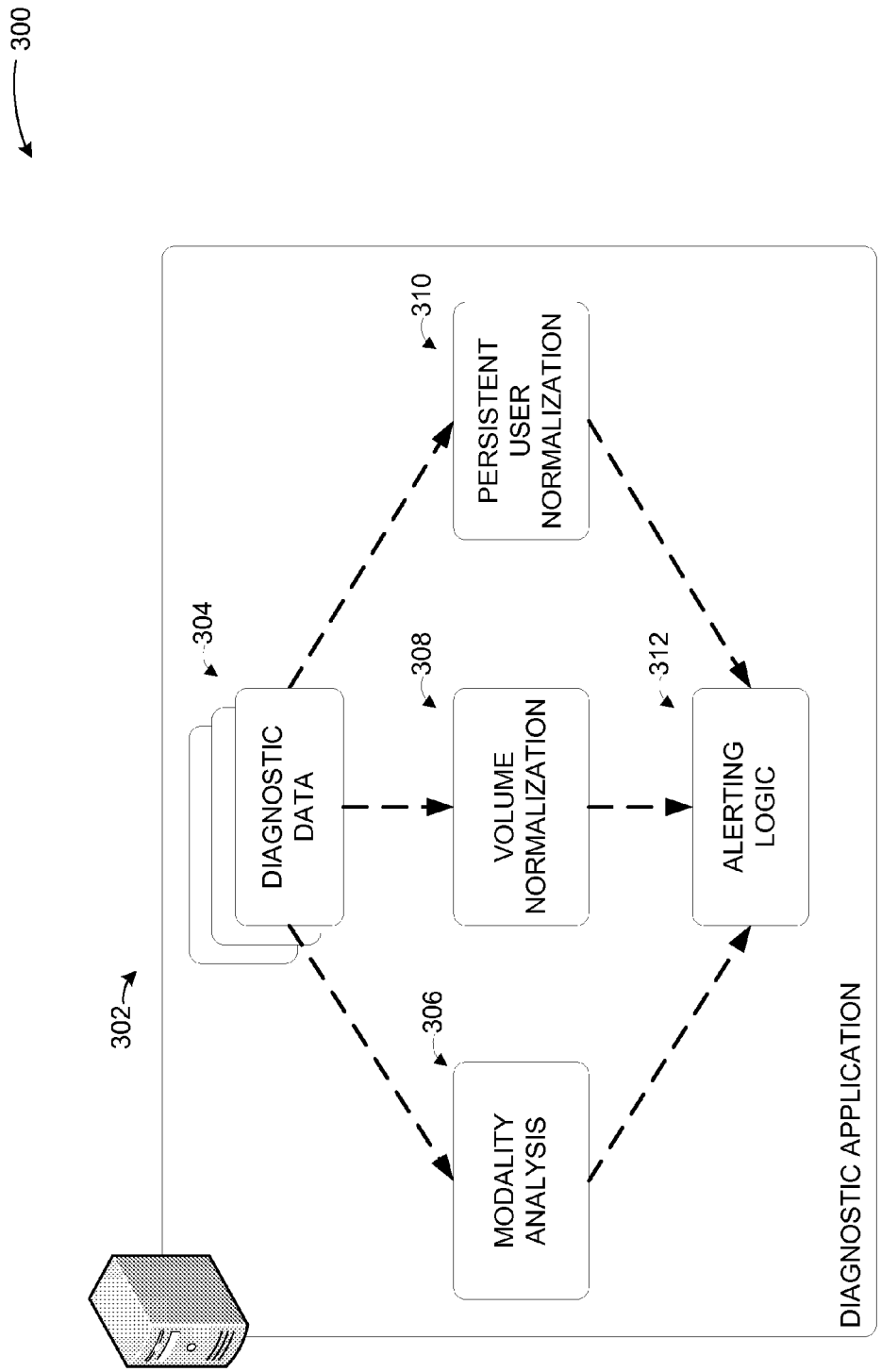
FIG. 3 illustrates major actions in a real time error detection system for multimodal communications.

FIG. 3 illustrates major actions in a real time error detection system for multimodal communications. A diagnostic application 302 for error detection in a multimodal communication system as shown in diagram 300 may analyze each modality separately measuring the volume of each failure code against the traffic volumes of the modalities it affects and using thresholds on the number of users impacted to limit the impact of persistent users.

Diagnostic application 302 may perform modality analysis 306, volume based normalization 308 and persistent user normalization 310 on diagnostic data 304 in determining thresholds for detecting errors, which are to be used in issuing alerts by alert logic 312. The alerting logic 312 may compute three parameters from the diagnostic data 304:

TOTAL_VOLUME (e.g., a count of the total number of sessions for each modality);

DIAG_VOLUME (e.g., a number of sessions that are affected by a failure per modality); and USER_VOLUME (e.g., a number of originating users or "callers" impacted by a failure per modality). Then, an alert (per modality) may be raised for the detected failure if: (100*DIAG_VOLUME/TOTAL_VOLUME)≥PERCENTAGE_THRESHOLD and USER_VOLUME≥USER_THRESHOLD.

The thresholds PERCENTAGE_THRESHOLD and USER_THRESHOLD may be configurable predefined threshold values, which may be optimized in system design to minimize noise and maximize effectiveness or configured by system administrators depending on specific circumstances of an implemented multimodal communication system. An example algorithm according to embodiments may be as follows:

Query All Recent Calls
Split calls by Media Type
Remove Duplicates
Determine Caller Name
Merge with Call Details
Merge with End Device Details
Merge with Users
Take User or End Device whichever is non-NULL
Calculate Volume per Diagnostic ID+Number of Callers Affected
Calculate Volume per Media Type
Calculate each Diagnostic IDs percentage of Volume by Media
Determine if percentage of volume and number of affected users=error/warning
Report alerts by diagnostic ID The systems and implementations of real time error detection based on analysis of diagnostic data in multimodal systems discussed above are for illustration purposes and do not constitute a limitation on embodiments. Such a system may be enabled by employing other modules, processes, and configurations using the principles discussed herein.

Figure 4:
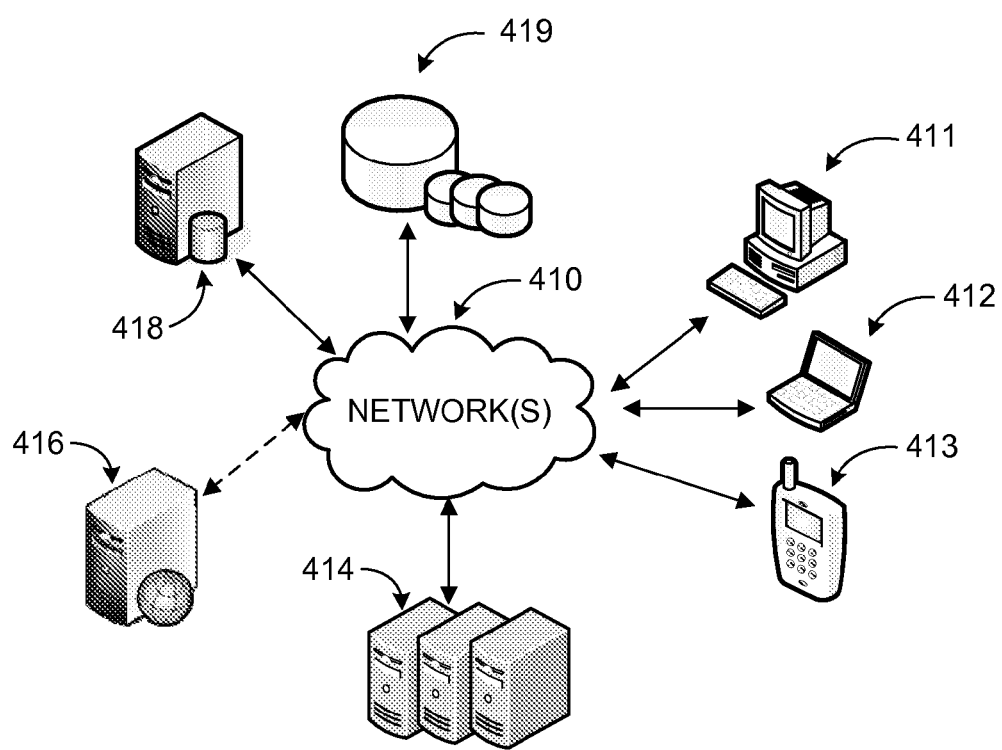
FIG. 4 is a networked environment, where a system according to embodiments may be implemented.

FIG. 4 is an example networked environment, where embodiments may be implemented. A diagnostic/error detection application in a multimodal communication system may be implemented via software executed over one or more servers 414 or a single server (e.g. web server) 416 such as a hosted service. The platform may communicate with client applications on individual computing devices such as a smart phone 413, a laptop computer 412, or desktop computer 411 ('client devices') through network(s) 410 providing communication services.

As discussed above, the diagnostic/error detection application may collect diagnostic data from various components of the system analyzing them based on modality, total traffic volume, and/or user variations. Alerts and/or reports may be issued based on this normalized analysis reducing noise in the data and surfacing potential problems that may be affecting larger number of users.

Client devices 411-413 may enable access to communication applications executed on remote server(s) (e.g. one of servers 414) as discussed previously. The server(s) may retrieve or store relevant data from/to data store(s) 419 directly or through database server 418.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to provide real time error detection in multimodal communication systems. Furthermore, the networked environments discussed in FIG. 4 are for illustration purposes only. Embodiments are not limited to the example applications, modules, or processes.

Figure 5:
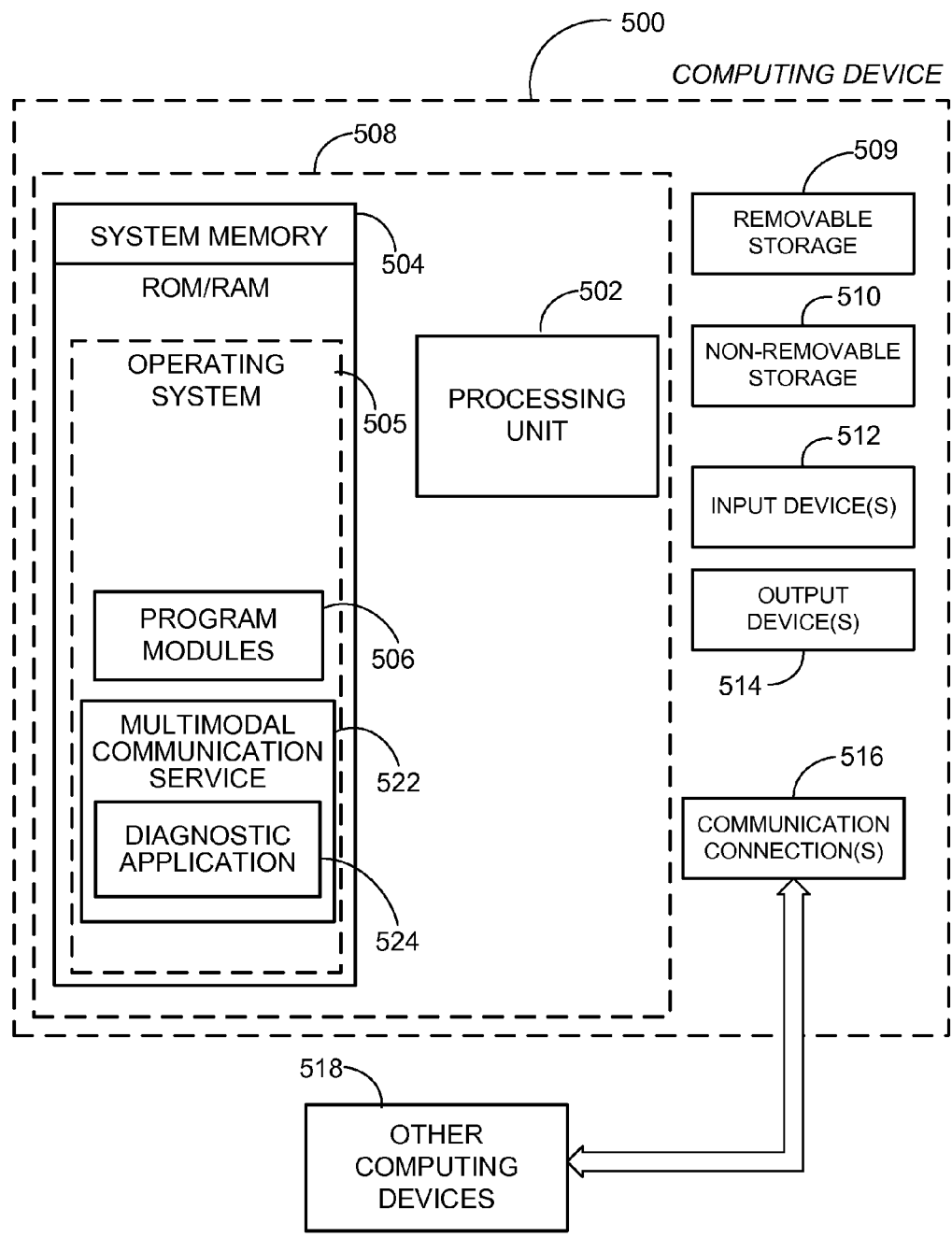
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be a server that enables real time error detection in multimodal communication systems and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, multimodal communication service 522, and diagnostic application 524.

Multimodal communication service 522 may provide communication services in a variety of modes such as audio, video, data exchange, text messaging, email, application sharing, and so on. In addition to facilitating communication sessions, multimodal communication service 522 may include other functionalities such as presence, record keeping, analysis, diagnosis, and comparable ones. Diagnostic application 524 may be a module that provides diagnosis/error detection services in conjunction with the communication services. Diagnostic application 524 may collect and/or receive diagnostic data from other components of the system. The application may then analyze the data normalizing it based on modality, total traffic volume, and/or user patterns, and issue alerts or reports as discussed above. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wireless network in a distributed computing environment, a satellite link, a cellular link, and comparable mechanisms. Other devices 518 may include computer device(s) that execute communication applications, storage servers, and comparable devices. Communication connection(s) 516 is one example of communication media. Communication media can include therein computer readable instructions, data structures, program modules, and includes any information delivery media. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 6:
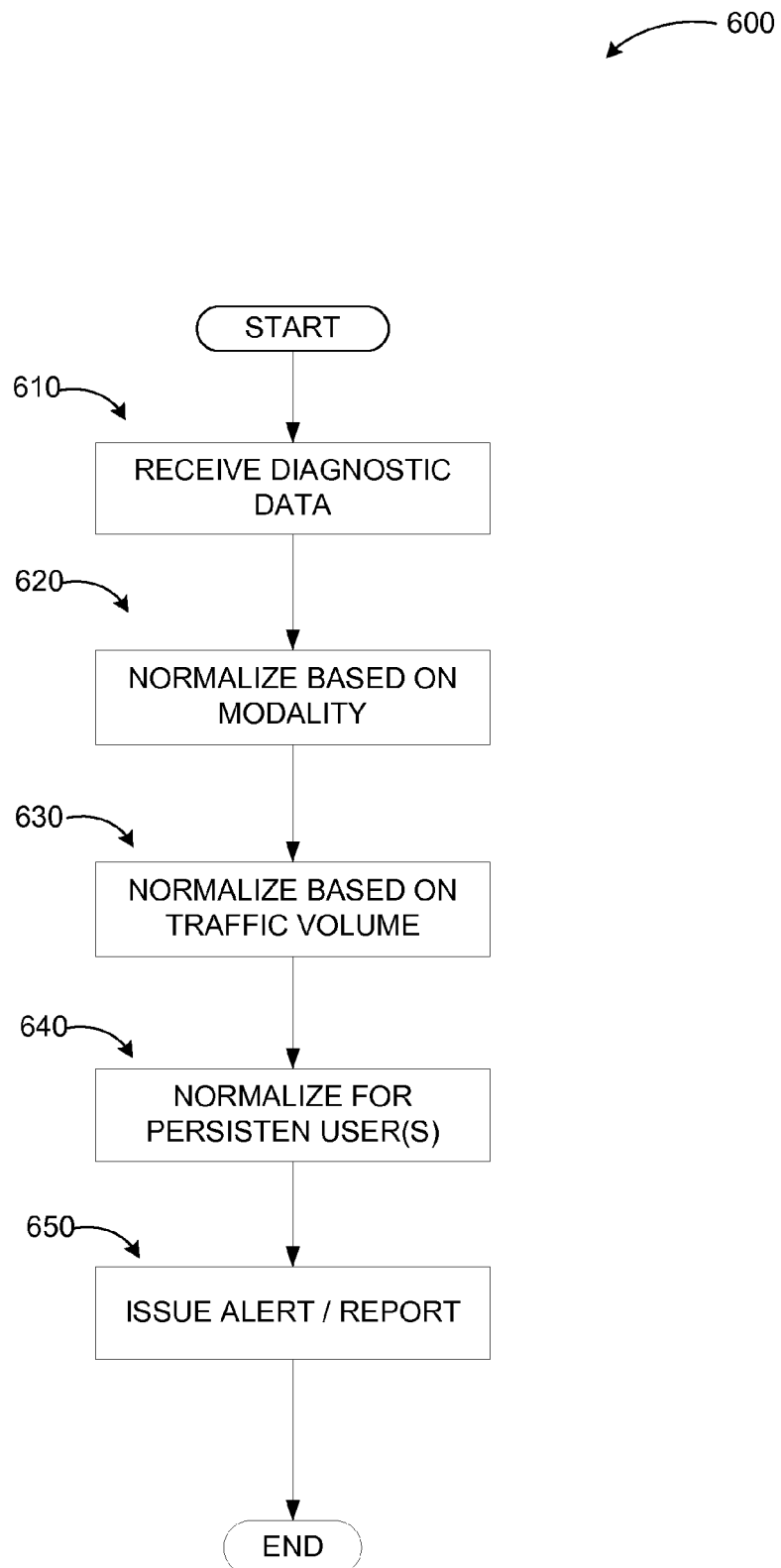
FIG. 6 illustrates a logic flow diagram for a process of real time error detection in a multimodal communication system.

FIG. 6 illustrates a logic flow diagram for a process of real time error detection in a multimodal communication system according to embodiments. Process 600 may be implemented by a server in an enhanced communication system providing multimodal communication services to clients.

Process 600 begins with operation 610, where diagnostic data is received at a centralized diagnosis/error detection application. The diagnostic data may be collected by centralized or distributed components of the communication system. At operation 620, the collected data may be normalized based on modality. As discussed previously, a number/duration/exchanged data may vary among different modalities. A much larger number of users may exchange text messages compared to those participating in application sharing sessions, for example. Thus, a fault in text messaging modality may appear much more frequently than one in application sharing modality drowning the latter when faults are analyzed without normalization. By normalizing the diagnostic data based on modalities, problems that may be significant for some modalities, but masked by the volume or detected errors can be surfaced.

At operation 630, diagnostic data may be further normalized based on traffic volume. Absolute number of failures may also be overlooked depending on total traffic in a system. For example, one hundred failures in a system with five thousand users may be more significant than the same number of errors in a system with one hundred thousand users. At operation 640, the diagnostic data may also be normalized based on user patterns. Artificial surfacing of failures based on persistent users may be prevented at this operation. At operation 650, a report or an alert may be issued based on the normalized analysis results.

The operations included in process 600 are for illustration purposes. Real time error detection/diagnosis according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part by a computing device for error detection in a multimodal communication system, the method comprising:
    receiving diagnostic data associated with failures in the multimodal communication system;
    grouping the diagnostic data based on modalities;
    normalizing the diagnostic data for each modality based on total traffic volume for each modality;
    further normalizing the diagnostic data based on usage patterns of users;
    issuing an alert if a failure exceeds a predefined threshold based on the normalized diagnostic data; and
    computing a total volume parameter representing a total number of communication sessions for each modality, a diagnostic volume parameter representing a total number of communication sessions affected by the failure for each modality, and a user volume parameter representing a total number of users originating a communication session affected by the failure for each modality.

2. The method of claim 1, further comprising:
    issuing the alert if a ratio of the diagnostic volume parameter and the total volume parameter exceeds a first threshold.

3. The method of claim 2, further comprising:
    issuing the alert if the ratio of the diagnostic volume parameter and the total volume parameter exceeds the first threshold and the user volume parameter exceeds a second threshold.

4. The method of claim 3, wherein the first and second thresholds are defined to optimize noise in alerts and effectiveness of diagnosis at system design time.

5. The method of claim 3, wherein the second threshold is configured to minimize an impact of persistent users who repeatedly initiate a communication session in response to the failure, thereby artificially increasing a profile of the failure in diagnosis.

6. The method of claim 1, further comprising:
    issuing a report based on an analysis of a plurality of failures exceeding one or more predefined thresholds based on the normalized diagnostic data.

7. The method of claim 1, further comprising:
    collecting the diagnostic data in one of a centralized manner and a distributed manner through components of the multimodal communication system.

8. The method of claim 7, further comprising:
    removing duplicate diagnostic data associated with a same user and a same communication session.

9. The method of claim 1, wherein the diagnostic data is collected over a predefined time period for each modality.

10. The method of claim 1, wherein the modalities include at least one from a set of: audio, video, data sharing, application sharing, whiteboarding, text messaging, instant messaging, email exchange, and online conferencing.

11. A computing device in a multimodal communication system for error detection and diagnosis, the device comprising:
    a memory storing instructions;
    a processor coupled to the memory, the processor executing at least one diagnosis application in conjunction with the instructions stored in the memory, wherein the diagnosis application is configured to:
        receive diagnostic data associated with failures in the multimodal communication system;
        determine communication sessions associated with a failure and one or more modalities used by each communication session associated with the failure;
        compute a total number of communication sessions for each modality, a total number of communication sessions associated with the failure, and a total number of users impacted by the failure for each modality; and
        define at least one threshold for raising an alert based on the computed numbers such that noise in diagnostic alerts is minimized and effectiveness of diagnostic alerts is maximized.

12. The device of claim 11, wherein the at least one threshold includes a first threshold configured to normalize error detection based on total traffic volume.

13. The device of claim 12, wherein the at least one threshold further includes a second threshold configured to normalize error detection based on usage patterns of users.

14. The device of claim 11, wherein the diagnosis application is further configured to separate modalities of a communication session that includes a plurality of modalities.

15. The device of claim 11, wherein the diagnosis application is further configured to collect the diagnostic data based on an administrator configurable period of time, and wherein the at least one threshold is further defined based on the diagnostic data collection time.

16. The device of claim 11, wherein the diagnosis application is further configured to remove duplicate diagnostic data employing user identifiers and communication session identifiers collected as part of the diagnostic data.

17. A computer-readable memory device with instructions stored thereon for error detection in a multimodal communication system, the instructions comprising:
    receiving diagnostic data associated with communication sessions facilitated by the multimodal communication system;
    determining communication sessions associated with abnormal behavior;
    determining one or more modalities used by each communication session associated with the abnormal behavior;

computing a total number of communication sessions for each modality;

computing a total number of communication sessions associated with the abnormal behavior;

computing a total number of users impacted by the abnormal behavior for each modality; and defining a threshold for raising an alert based on the computed numbers such that noise in diagnostic alerts is minimized and effectiveness of diagnostic alerts is maximized.

18. The computer-readable memory device of claim 17, wherein the instructions comprise:

enabling an administrator to modify the threshold based on at least one characteristic of the multimodal communication system.

19. The computer-readable memory device of claim 17, wherein the threshold is further defined based on at least one of: an amount of generated data and an amount of exchanged data in each of the communication sessions.

* * * * *